J. WOOD.
Improvement in Cages for Globe-Valves.
No. 132,344. Patented Oct. 15, 1872.
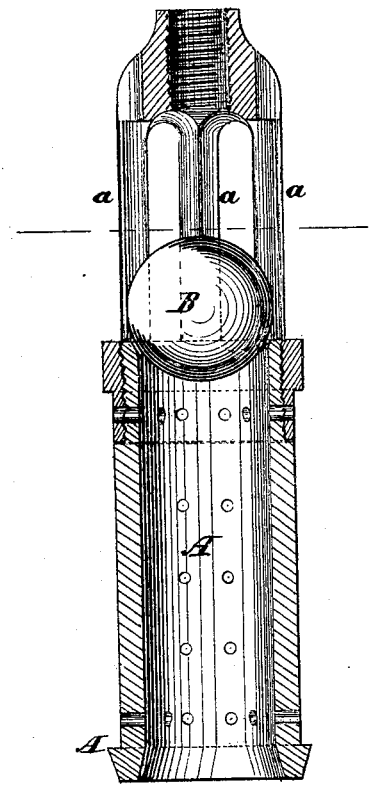
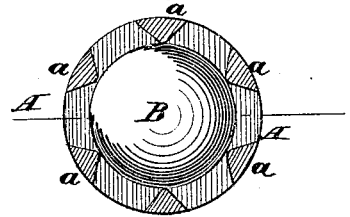

UNITED STATES PATENT OFFICE.

JOHN WOOD, OF FRANKLIN, PENNSYLVANIA.

IMPROVEMENT IN CAGES FOR GLOBE-VALVES.

Specification forming part of Letters Patent No. 132,344, dated October 15, 1872.

*To all whom it may concern:*

Be it known that I, JOHN WOOD, of Franklin, in the county of Venango and State of Pennsylvania, have invented a new and Improved Valve-Cage for Pumps, Cylinders, &c., of which the following is a specification:

Figure 1 is a vertical longitudinal section of my invention, and Fig. 2 a horizontal transverse section of the same.

Similar letters of reference indicate corresponding parts.

This invention relates to an improved construction of cage for globular pump-valves with the object of preventing the clogging of the valve by means of sand, gravel, or other impurities entering along the bars of the cage.

The invention consists in making the bars of the cage convex or with a sharp edge in cross-section on the inner side, so that the ball will be in contact with the least possible extent of surface within the cage.

Heretofore the inner sides of the bars of cages for globe-valves were made concave to fit the balls, and there were, consequently, numerous points of contact for the ball. Any impurity entering between the ball and one of the cage-bars was apt to clog the valve and prevent its working. On my improved cage this inconvenience cannot take place, as the ball would easily remove any obstruction between its circumference and the narrow edge of the cage-bars.

A, in the drawing, is the cage for a globe-valve, B, and is provided with six, more or less, bars, $a\ a$, between which the ball B is contained. Each of the bars $a$ is made of such form that it has a sharp edge or a convex surface in contact with the valve, as is clearly shown in Fig. 2.

It is evident that the cage as well as the valve can be made of any suitable metal, alloy, or other material.

The invention is applicable to steam-engines, cold or hot-water pumps, and other devices.

Having thus described my invention, I claim as new and desire to secure by Letters Patent—

The globe-valve cage, made with the bars $a$ sharp or convex on the inner edges, substantially as and for the purpose herein shown and described.

JOHN WOOD.

Witnesses:
W. S. CARROLL,
R. L. COCHRAN.